Patented Nov. 5, 1935

2,019,852

UNITED STATES PATENT OFFICE 2,019,852

PRODUCTION OF ASBESTOS CEMENT SHEETS, TILES, AND THE LIKE

Eric Russell Harrap, Chorlton-Cum-Hardy, Manchester, England, assignor to Turner & Newall Limited, Spotland, England, a company of Great Britain No Drawing. Application August 21, 1934, Serial No. 740,850. In Great Britain April 27, 1934

11 Claims.  (Cl. 25—154)

This invention relates to the manufacture of asbestos cement sheets, tiles and the like having a hard, smooth, glossy surface which is highly resistant to penetration and which can have patterns thereon for decorative purposes.

One object of my invention is to provide an improved process for the production of the said hard, smooth, glossy surface.

Another object of my invention is to produce an asbestos cement sheet, tile or the like having a hard, smooth, glossy, non-efflorescent surface.

In the process employed in my invention the asbestos cement sheets in the moist state as they come from the machine in which they are made are laid upon a table having a porous base. The sheets are smoothed with a tool resembling a plasterer's float and the surface treated with a base mixture containing water and zinc oxide, zinc carbonate or other insoluble salt of zinc. If desired, the mixture may contain fillers such as silica, calcium carbonate or the like and if required pigments for colouring purposes. A suitable mixture is:—

| | Parts |
|---|---|
| Zinc oxide | 5 |
| Titanium white | 2 |
| Silica | 1½ |
| Water | 20 |

This mixture is brushed on to the moist asbestos cement sheet and smoothed with a tool resembling a plasterer's float. A layer consisting of a mixture of soap solution and zinc oxide, zinc carbonate or other insoluble salt of zinc is then sprayed or brushed on to the sheet and smoothed. A suitable composition for this layer is:—

| | Parts |
|---|---|
| Soap | 1 |
| Zinc oxide | 2 |
| Water | 320 |

The function of the soap solution as above is that of an anti-friction material which enables a glaze to be developed in the subsequent process. The surface is now brought to a gloss by means of hot irons. When the asbestos cement has set hard, the surface is treated with a solution of an alkaline silicate in water, a suitable mixture being:—

| | Parts |
|---|---|
| Silicate of soda or potash (59.5° Baumé solution) | 5 |
| Water | 4 |

The sheet is thereafter dried and baked at a temperature of at least 300° F. for one to two hours to effect the combination of the zinc oxide and silicate. It is next treated with a solution of zinc chloride of 13–18.8° Baumé and dried again.

While the relative amounts of the mixture and solutions described above may vary, the preferred amounts are as follows:—

| | Parts |
|---|---|
| Base mixture | 12 |
| Soap mixture | 1 |
| Silicate solution as above | 2¼ |
| Zinc chloride solution (16° Baumé) | 2¼ |

The zinc chloride treatment has the very important practical result that any tendency for the sheets to effloresce is avoided. The reaction between the zinc oxide and sodium silicate leads to the production of caustic soda, which tends to form efflorescent sodium carbonate. The addition of zinc chloride leads to the formation of sodium chloride, which is neutral and non-efflorescent, and zinc oxychloride, which imparts increased hardness to the surface.

In place of the zinc oxide used in the base mixture any other insoluble substance may be used capable of reacting with sodium silicate to form a hard insoluble layer of silicate. If the insoluble substance is an oxide, hydroxide or carbonate, sodium hydroxide or sodium carbonate will be formed in the silicate layer, and, as these bodies are efflorescent, in such cases I convert them into inactive sodium chloride by treatment with a chloride solution. In cases where the oxide or hydroxide is used, this treatment has the further advantage that any excess of the oxide or hydroxide will react with the chloride solution to give hard, insoluble oxychlorides, provided that the chloride is appropriately chosen. These bodies are nearly as hard as the silicates, and it may sometimes be desirable to omit the treatment with sodium silicate altogether, the hard surface being then entirely derived from the reaction occurring between the insoluble oxide or hydroxide and the chloride solution to give an oxychloride. The chloride should of course be so chosen that the reaction between it and the oxide proceeds far enough to yield a sufficient quantity of the hard oxychloride. Alternatively, the chloride solution may be replaced by solutions of sulphates or phosphates, the corresponding hard oxysulphates and oxyphosphates then being produced.

The substances which it is preferred to use in the base mixture are the oxides, hydroxides or carbonates of zinc, calcium and magnesium. The nature of the treatment after the production of the glaze depends upon the composition of the surface layer thus formed.

If the surface layer contains zinc oxide, zinc hydroxide, magnesium oxide or magnesium hydroxide as the predominating material, silicate may be applied before or after a zinc or other chloride solution and the asbestos cement sheets must be baked at a temperature not lower than 300° F. after the silicate has been applied, although not necessarily before the zinc or other chloride solution is applied. If desired there may be two bakings after addition of the silicate, one before and one after addition of the chloride, but this is generally unnecessary. If the silicate is dispensed with, a zinc chloride solution may advantageously be used in place of it and the baking may be replaced if desired by simple drying. A suitable solution is one of zinc chloride of 13–18.8° Baumé. Thus, when magnesium oxide is used, the base mixture may have the following composition:—

| | Parts |
|---|---|
| Light calcined magnesia | 6½ |
| Titanium white | 2 |
| Silica powder | 1½ |
| Water | 20 |

The soap mixture applied to the sheets treated with this base mixture may have the following composition:—

| | Parts |
|---|---|
| Soap | 4 |
| Light calcined magnesia | 2 |
| Water | 240 |

1 part of the soap mixture may be applied for every 12 parts of the base mixture, and when setting is complete and the sheets have become hard, the surface may be treated with 2¼ parts of a zinc chloride solution of 16° Baumé.

If zinc carbonate predominates in the surface layer, alkaline silicate must be used and be applied before the zinc chloride or other solution. In this case the baking is not necessary, though it is preferable. The sheet may be baked or dried, if desired, after the silicate has been added but before addition of the zinc chloride or other solution. A suitable solution is one of zinc chloride of 6.7 to 13° Baumé.

If calcium hydroxide, whether added as such or formed by decomposition of higher calcium silicates, predominates in the surface layer, an alkaline silicate must be applied before the zinc chloride or other solution, but baking is unnecessary. A suitable chloride solution is one of zinc or magnesium chloride of 13 to 18.8° Baumé. Thus, when calcium hydroxide is used, the base mixture and soap mixture may have the same composition and be used in the same proportions as in the magnesium oxide example given above, magnesium oxide being of course replaced in both mixtures by calcium hydroxide. When setting is complete, the hardened surface may be treated with 2¼ parts of a solution having the following composition for every 12 parts of the base mixture:—

| | Parts |
|---|---|
| Silicate of soda or potash solution (59.5° Baumé) | 5 |
| Water | 4 | and thereafter with a 16° Baumé solution of zinc chloride.

Calcium carbonate has a high reaction temperature with alkaline silicate and is therefore generally used only in mixtures. The same applies to magnesium carbonate.

In addition to the chlorides of zinc and magnesium mentioned above, solutions of the chlorides of barium and calcium may be used. These lead to insoluble oxides, and accordingly the chlorides of zinc and magnesium are preferred, because with appropriate oxides or hydroxides they lead to oxychlorides which have a cementing action and in some cases, (e. g. when magnesium oxide and zinc chloride are used), to double oxychlorides which are relatively hard. Ammonium chloride may also be used, but as a rule it is in this case necessary to remove the fumes of ammonia that are evolved. Yet again zinc sulphate or phosphate solutions may be used on, for instance, surfaces treated with magnesium oxide. On the other hand the use of such salts as nitrates should be avoided, because they give rise to deliquescent salts.

The sheets produced by the process have a fine, hard, smooth and glossy surface, and they can be provided with patterns during manufacture, either while they are in a soft state or after hardening and before baking. For waterproofing purposes they may be dipped into a bath of molten wax, resin, or similar material.

I claim:—

1. In a process for imparting to articles of asbestos cement a hard, smooth, glossy surface which is highly resistant to penetration, the steps which comprise treating the surface with at least one member chosen from the insoluble in water compounds of elements contained in Group II of the periodic table, namely, zinc, calcium, and magnesium, and thereafter producing a hard, smooth, glossy, non-efflorescent surface highly resistant to penetration by reacting chemically on this member or members.

2. In a process for imparting to articles of asbestos cement a hard, smooth, glossy surface which is highly resistant to penetration, the steps which comprise forming on the surface a permanent hard silicate layer and thereafter rendering this layer non-efflorescent by treatment with a soluble inorganic chloride.

3. In a process for imparting to articles of asbestos cement a hard, smooth, glossy surface which is highly resistant to penetration, the steps which comprise treating the surface successively with at least one member chosen from the insoluble in water compounds of elements contained in Group II of the periodic table, namely, zinc, calcium, and magnesium, and with an alkaline silicate and thereafter rendering the surface non-efflorescent by treatment with a soluble inorganic chloride.

4. In a process for imparting to articles of asbestos cement a hard, smooth, glossy surface which is highly resistant to penetration, the steps which comprise treating the surface successively with at least one member chosen from the insoluble in water compounds of elements contained in Group II of the periodic table, namely, zinc, calcium, and magnesium, and with at least one member selected from the group consisting of solutions of chlorides, phosphates and sulphates, and capable of reacting with said first member to produce a non-efflorescent surface.

5. In a process for imparting to articles of asbestos cement a hard, smooth, glossy surface which is highly resistant to penetration, the step which comprises forming a non-efflorescent silicate layer by chemical reaction in the presence of a soluble inorganic chloride.

6. In a process for imparting to articles of asbestos cement a hard, smooth, glossy surface which is highly resistant to penetration, the steps which comprise treating the surface successively with at least one member chosen from the insoluble in water compounds of elements contained in Group II of the periodic table, namely, zinc, calcium, and magnesium, and with a soap solution and thereafter treating the surface with an alkaline silicate and with a soluble inorganic chloride.

7. In a process for imparting to articles of asbestos cement a hard, smooth, glossy surface which is highly resistant to penetration, the steps which comprise treating the surface successively with at least one member chosen from the insoluble in water compounds of elements contained in Group II of the periodic table, namely, zinc, calcium, and magnesium, and with a soap solution and thereafter treating the surface with at least one member of the group consisting of solutions of chlorides, phosphates and sulphates, and capable of reacting with said first member to produce a non-efflorescent surface.

8. In a process for imparting to articles of asbestos cement a hard, smooth, glossy surface which is highly resistant to penetration, the steps which comprise treating the surface with zinc oxide and a soap solution and then with sodium silicate solution, rendering the surface hard, smooth and glossy by baking it at a temperature of above 300° F., and thereafter rendering it non-efflorescent by treatment with a member of the group consisting of the solutions of zinc chloride, magnesium chloride, barium chloride, calcium chloride and ammonium chloride.

9. In a process for imparting to articles of asbestos cement a hard, smooth, glossy surface which is highly resistant to penetration, the steps which comprise treating the surface with zinc oxide and a soap solution, then with sodium silicate solution and finally with zinc chloride solution, whereby to render the surface non-efflorescent, and then baking at a temperature above 300° F.

10. In a process for imparting to articles of asbestos cement a hard, smooth, glossy surface which is highly resistant to penetration, the steps which comprise treating the surface successively with magnesium oxide and zinc chloride solution, whereby to render the resultant layer non-efflorescent, and then drying the sheet.

11. In a process for imparting to articles of asbestos cement a hard, smooth, glossy surface which is highly resistant to penetration, the steps which comprise forming a layer of calcium hydroxide on the surface, rendering this layer hard, smooth and glossy by treatment with sodium silicate solution, and thereafter rendering the surface non-efflorescent by treatment with zinc chloride solution.

ERIC RUSSELL HARRAP.